United States Patent [19]
Douglas

[11] 3,878,386
[45] Apr. 15, 1975

[54] LIGHTED BEVERAGE GLASS

[76] Inventor: David Douglas, 1119 Lincoln Blvd., Manitowoc, Wis. 54220

[22] Filed: July 11, 1973

[21] Appl. No.: 378,221

Related U.S. Application Data

[63] Continuation of Ser. No. 191,427, Oct. 21, 1971, abandoned.

[52] U.S. Cl. ............................ 240/6.4 G; 240/2 LC
[51] Int. Cl. ........................ F21l 15/00; F21v 33/00
[58] Field of Search ........... 240/6.4 G, 10.66, 2 LC; 248/346.1

[56] References Cited
UNITED STATES PATENTS

| | | | |
|---|---|---|---|
| 2,177,337 | 10/1939 | Stein | 240/6.4 G |
| 2,249,691 | 7/1941 | Gelardin | 240/10.66 |
| 2,532,181 | 11/1950 | Moore | 240/6.4 G |
| 2,745,947 | 5/1956 | Sansous | 240/6.4 G |
| 3,374,344 | 3/1968 | Rudolph | 240/6.4 G |
| 3,633,863 | 1/1972 | Abbey | 248/346.1 |

*Primary Examiner*—Joseph F. Peters

[57] ABSTRACT

A lighted beverage glass having a stem with a central bore extending therethrough. A cup-shaped glass mounting portion is provided at the top of the stem and has a glass shell member removably mounted therein. A plurality of horizontally extending gripping ribs are provided on the mounting portion to securely retain the glass therein. An annular shoulder is formed at the top portion of the central bore. A light assembly is mounted in the central bore of the stem for directing light through the bottom of the glass. The light assembly includes an electric bulb, a dry cell battery and a spring member mounted between the bulb and the battery. The annular shoulder serves as a seat for the electric bulb.

2 Claims, 5 Drawing Figures

PATENTED APR 15 1975　3,878,386
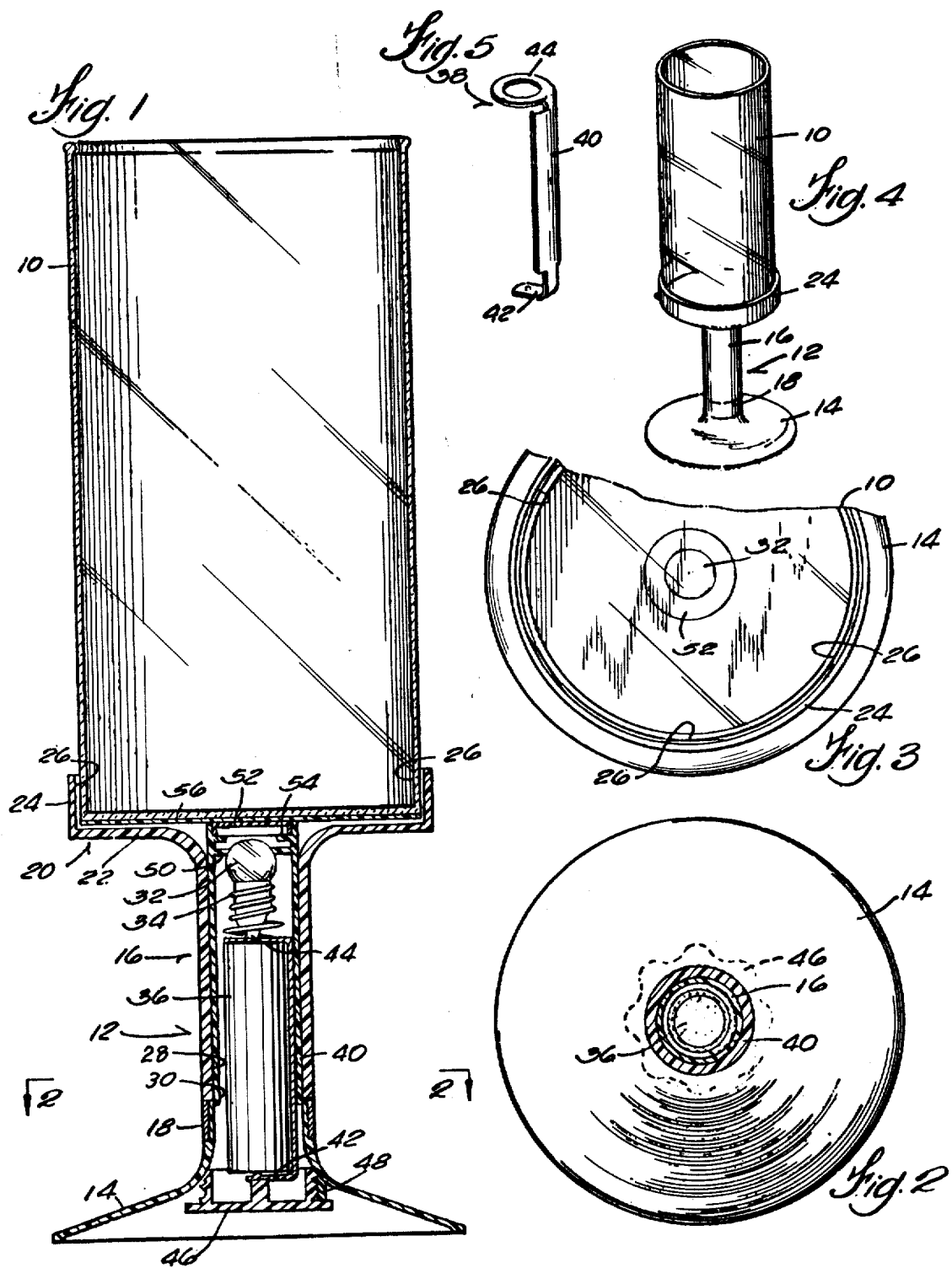

LIGHTED BEVERAGE GLASS

This is a continuation of application Ser. No. 191,427, filed Oct. 21, 1971, now abandoned.

BACKGROUND OF THE INVENTION

1. Field of the Invention

This invention relates to improvements in a lighted beverage glass.

2. Description of the Prior Art

This invention relates to certain improvements over prior lighted beverage glasses such as that shown in U.S. Pat. No. 3,374,344. The present invention constitutes an improvement over that shown in the above-identified patent in that it is designed for use with a glass or shell member of conventional design, whereas in the above patent a specially designed shell member is required. Additional improvements reside in the construction of the light assembly. The present invention affords a simplified arrangement which can be constructed at a considerably lower cost than the light assembly arrangement of the prior art patent referred to above.

SUMMARY OF THE INVENTION

A lighted beverage glass having a stem means with a base portion and a stem portion and with a central bore extending therethrough. The stem portion has a cup-shaped glass mounting portion at the upper end thereof, which is comprised of a bottom wall and an upstanding circular side wall having a plurality of horizontally extending gripping ribs formed on the inner face thereof. Such ribs make tight contact with the outer surface of a glass of conventional design to keep it retained securely in place. A light assembly is mounted in the central bore of the stem for directing light through the bottom of the glass. Such assembly includes an electric bulb, a dry cell battery and a spring member mounted between the bulb and the battery. An annular shoulder is formed at the top portion of the central bore to serve as a seat for the bulb.

DESCRIPTION OF THE DRAWING

FIG. 1 is a vertical sectional view of a lighted beverage glass made in accordance with this invention;

FIG. 2 is a horizontal sectional view taken along line 2—2 of FIG. 1;

FIG. 3 is a partial top plan view of the lighted beverage glass shown in FIG. 1;

FIG. 4 is a perspective view of the lighted beverage glass; and

FIG. 5 is a perspective view of the battery cradle which is one of the component parts of the light assembly.

DESCRIPTION OF THE PREFERRED EMBODIMENT

Referring now to the drawings in detail, FIG. 1 shows the lighted beverage glass of this invention which is the lighted beverage glass or shell 10 which is removably comprised of a glass or shell 10 which is removably mounted on a stem assembly 12. The assembly 12 is comprised of a base portion 14 and an upper stem portion 16 slidably mounted on the base portion as most clearly shown in FIG. 1. A decorative ring member 18 is mounted between the stem portions 14 and 16 as shown.

While the materials of the structure described above may vary to some extent, in the preferred embodiment the shell 10 is made of glass and the upper stem and base portions 14 and 16 are made of molded plastic.

The upper portion of stem 16 is provided with a cup-shaped glass mounting portion 20 having a bottom wall 22 and an upstanding circular side wall 24. A plurality of horizontally extending gripping ribs 26 are formed on the inner face of wall 24, closely adjacent the top edge of the wall. Commercially available glass tumblers of the type used in this invention are not manufactured to close dimensional tolerances and thus the outside dimensions of such tumblers will vary somewhat from tumbler to tumbler. Such variations are effectively compensated for by the ribs 26 on wall 24. It will be appreciated that wall 24 is somewhat flexible so that when glass 10 is inserted into glass mounting portion 20, wall 24 will be flexed outwardly causing ribs 26 to make tight contact with the outer surface of the glass and thereby keep it retained securely in place. The glass can be easily removed for washing by simply gripping stem 16 in one hand and removing the glass with the other hand by tilting it with respect to the stem. It should be noted at this point that the secure yet removable retention of the glass in the stem is accomplished without requiring a special groove or other configuration in the external surface of the glass shell 10.

The liquid in the glass shell is lighted from below giving it a distinctive appearance by means of a light assembly 28 mounted in the bore 30 of base portion 14 as clearly shown in FIG. 1. Assembly 28 is comprised of an electric incandescent bulb 32 of conventional design threaded into the top portion of a spring member 34. Electrical power for light bulb 32 is provided by a dry cell battery 36 also of conventional design. Battery 32 is mounted in a metal cradle member 38 (FIG. 5) which is comprised of a body portion 40 having a pair of contact flanges 42 and 44 formed at opposite ends thereof. The assembly is held securely inside bore 30 by a threaded switch knob 46 adapted for threaded engagement with threaded portion 48 formed in base 14. An annular shoulder 50 formed at the top of bore 30 serves as a seat for bulb 32. This arrangement wherein the tip portion of the bulb projects slightly past the shoulder not only serves to locate the bulb and the rest of the assembly properly inside bore 30, but also virtually eliminates the possibility of bulb breakage.

The top end of bore 30 is sealed by a transparent disc member 52 seated against a shoulder 54 and held in place by a suitable adhesive. If it is desired to change the color of the light passing up into the glass, transparent plastic discs 56 of various colors, such as red, blue, etc., can be inserted into the glass mounting portion 20 before the glass tumbler is mounted therein.

With the parts assembled as shown in FIG. 1, the electrical current path for energizing bulb 32 can be traced starting with the bottom of the battery case through cradle 38, spring 34, the filament of bulb 32 (not shown), the tip of the bulb and then to the center pole of the battery.

The lighted beverage glass described above is designed particularly for use as a beer glass. In use the light is turned on by rotating switch knob 46 in a clockwise direction. Such rotation will force battery 36 upwardly in bore 30 until the center pole of the battery makes contact with the tip of bulb 32 to thus complete the circuit for energizing the bulb. The light shining up through transparent disc 52 and colored disc 56 and the bottom of the glass shell 10 will cause the beer in the shell to glow, producing a unique and pleasing appearance. The bubbles in the beer will add to this effect. When it is desired to turn off the light, this is accomplished by simply turning knob 46 in a counterclockwise direction until the bias of spring 34 forces the battery out of contact with the tip of the bulb.

I claim:

1. A lighted beverage glass comprising:

a stem means having a base portion and a stem portion fastened to the base portion, said stem means having a central bore extending therethrough, said stem portion having a cup-shaped glass mounting portion at the upper end thereof, said cup-shaped glass mounting portion including a planar bottom wall, an upstanding, annular side wall made of a flexible material and extending substantially perpendicularly from said bottom wall, and a plurality of gripping ribs projecting laterally inwardly from the inner face of said side wall closely adjacent the top edge thereof, said ribs adapted to make tight contact with the outer surface of a glass adjacent the bottom thereof and thereby securely retain the glass in said cup-shaped glass mounting portion;

a glass removably mounted in said cup-shaped glass mounting portion;

a light assembly mounted in said central bore of said stem means for directing light through the bottom of said glass, said light assembly including an electric incandescent bulb, a dry cell battery, a spring mounted between said bulb and said battery, and means for selectively establishing electrical contact between said bulb and said battery to thereby establish an electrical current path for energizing said bulb; and an annular shoulder formed in said stem means at the top portion of said central bore to serve as a seat for said bulb with the top portion of said bulb projecting slightly past said shoulder, said spring biasing said bulb against said seat to thereby reduce the possibility of bulb breakage.

2. A lighted beverage glass according to claim 1 wherein said light assembly includes a metallic cradle member for holding said battery located inside said central bore, said cradle member having a body portion and a pair of contact flanges which are located on the opposite ends of said body and between which said battery is held, said spring bearing against the upper one of said cradle member flanges, and a switch knob threaded into a threaded portion formed in said base for supporting the lower one of said cradle member flanges and adapted for manual rotation to move said battery into contact with said bulb against the bias of said spring.

* * * * *